(12) United States Patent
Eriksson et al.

(10) Patent No.: US 11,265,810 B2
(45) Date of Patent: Mar. 1, 2022

(54) PROVISION OF TIME INFORMATION TO A WIRELESS DEVICE

(71) Applicant: Telefonaktiebolaget LM Ericsson (publ), Stockholm (SE)

(72) Inventors: Erik Eriksson, Linköping (SE); Pål Frenger, Linköping (SE); Martin Hessler, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 56 days.

(21) Appl. No.: 16/913,539

(22) Filed: Jun. 26, 2020

(65) Prior Publication Data

US 2020/0329430 A1 Oct. 15, 2020

Related U.S. Application Data

(63) Continuation of application No. 16/441,273, filed on Jun. 14, 2019, now Pat. No. 10,736,034, which is a continuation of application No. 16/202,736, filed on Nov. 28, 2018, now Pat. No. 10,362,537, which is a continuation of application No. 15/320,826, filed as application No. PCT/EP2014/063871 on Jun. 30, 2014, now Pat. No. 10,172,084.

(51) Int. Cl.
*H04W 52/02* (2009.01)
*H04W 56/00* (2009.01)

(52) U.S. Cl.
CPC ....... *H04W 52/0216* (2013.01); *H04W 56/00* (2013.01); *H04W 56/0015* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 2011/0171949 A1 | 7/2011 | Liao et al. | |
| 2012/0163250 A1* | 6/2012 | Chin | H04W 56/001 370/280 |
| 2013/0201966 A1 | 8/2013 | Weng et al. | |
| 2013/0201973 A1* | 8/2013 | Ye | H04W 56/00 370/336 |
| 2013/0301445 A1 | 11/2013 | Abe et al. | |

* cited by examiner

*Primary Examiner* — Ayanah S George
(74) *Attorney, Agent, or Firm* — Murphy, Bilak & Homiller, PLLC

(57) ABSTRACT

There is provided provision of timing information of a first timing information source using timing information of a second timing information source to a wireless device. A network node determines that second timing information from the second timing information source is available and that timing information from the first timing information source is derivable from the second timing information. The network node instructs the wireless device to use the second timing information as a source for deriving first timing information of the first timing information source.

13 Claims, 6 Drawing Sheets

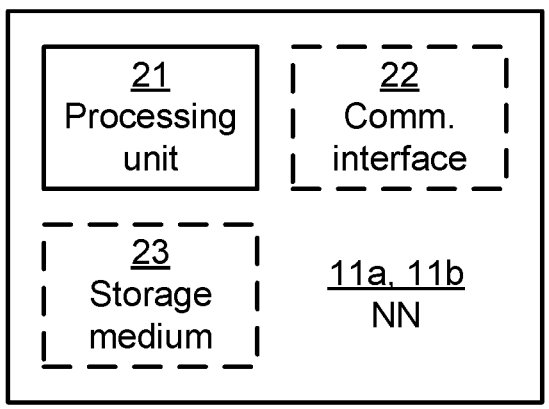
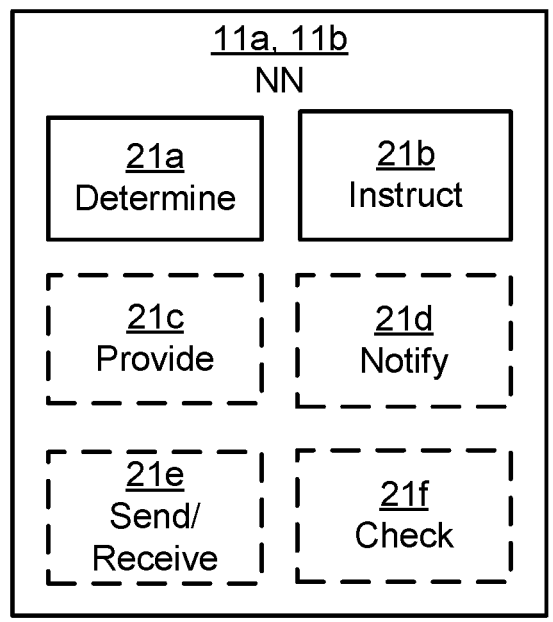
Fig. 2a
Fig. 2b
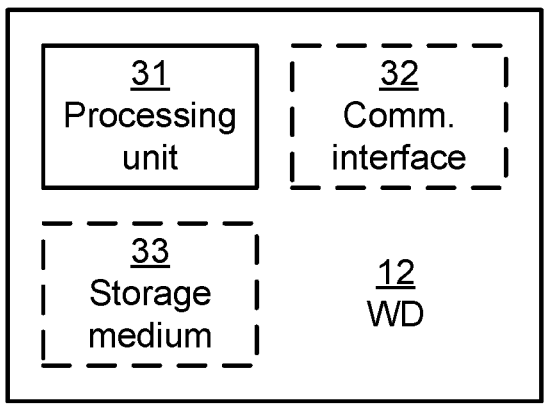
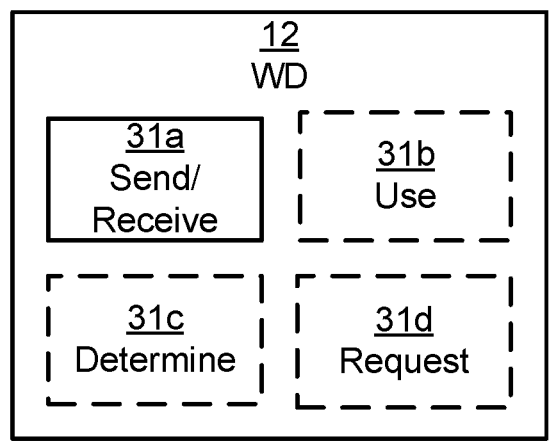
Fig. 3a
Fig. 3b
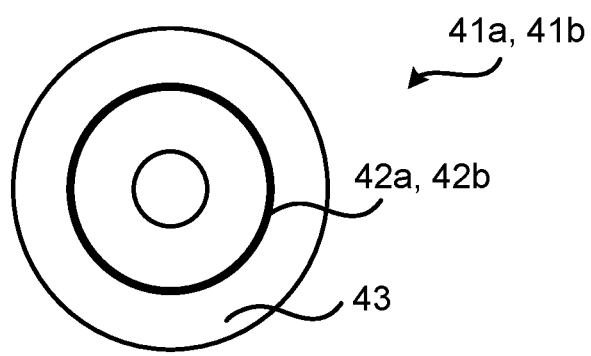
Fig. 4

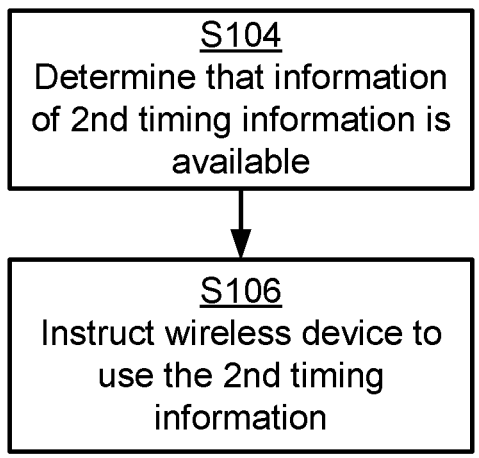
Fig. 5
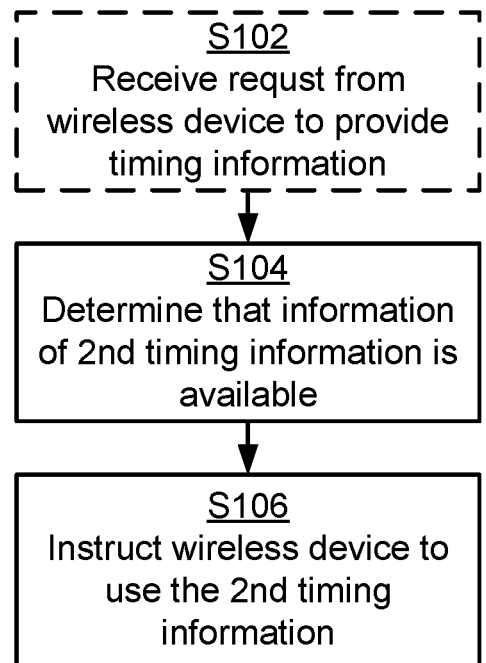
Fig. 6
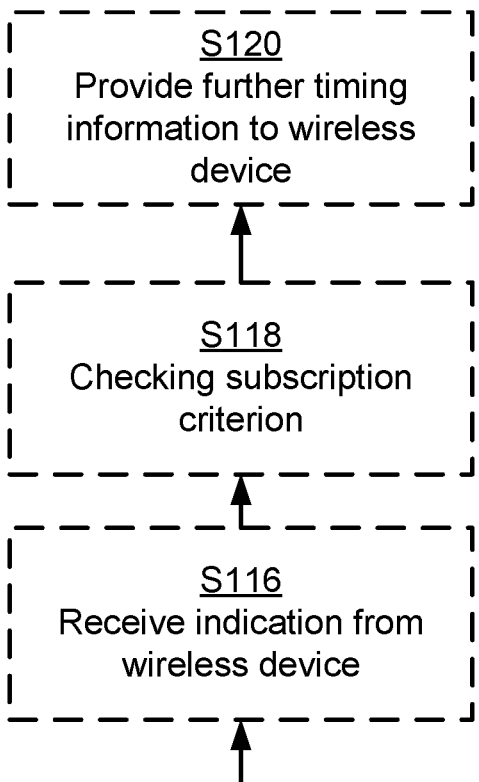
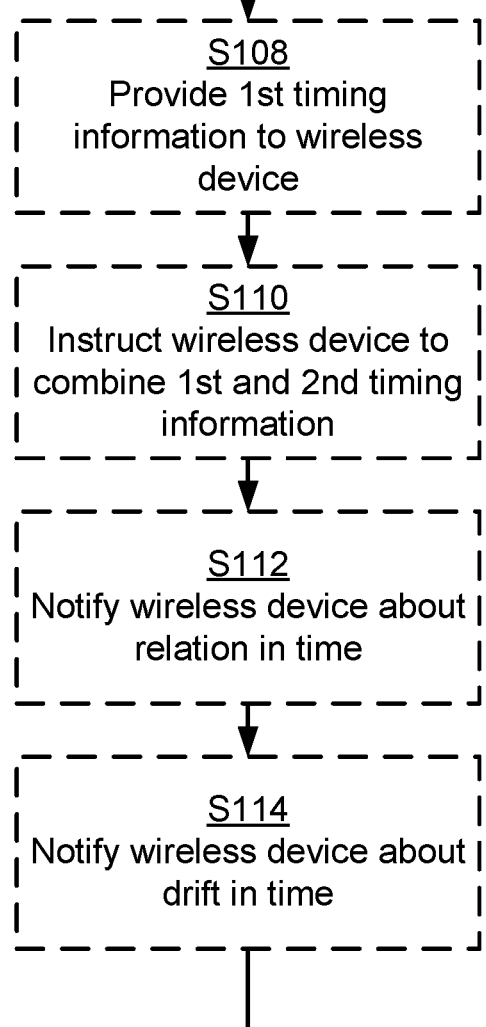

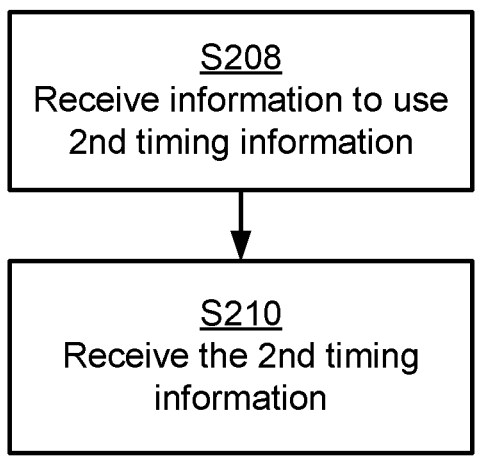
Fig. 7
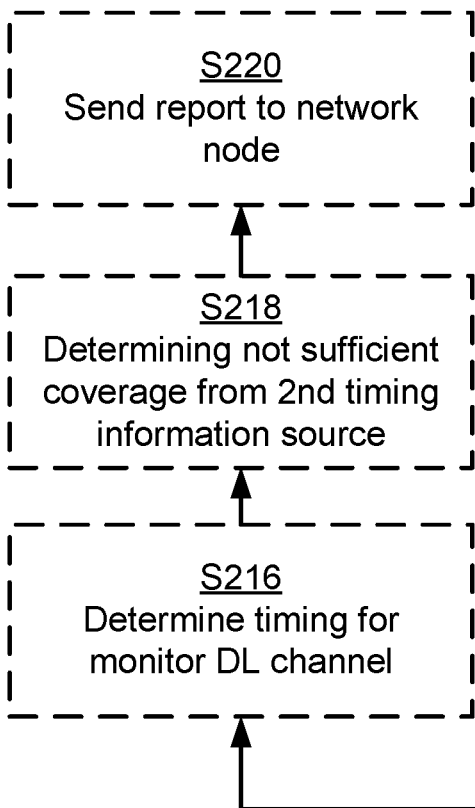
Fig. 8
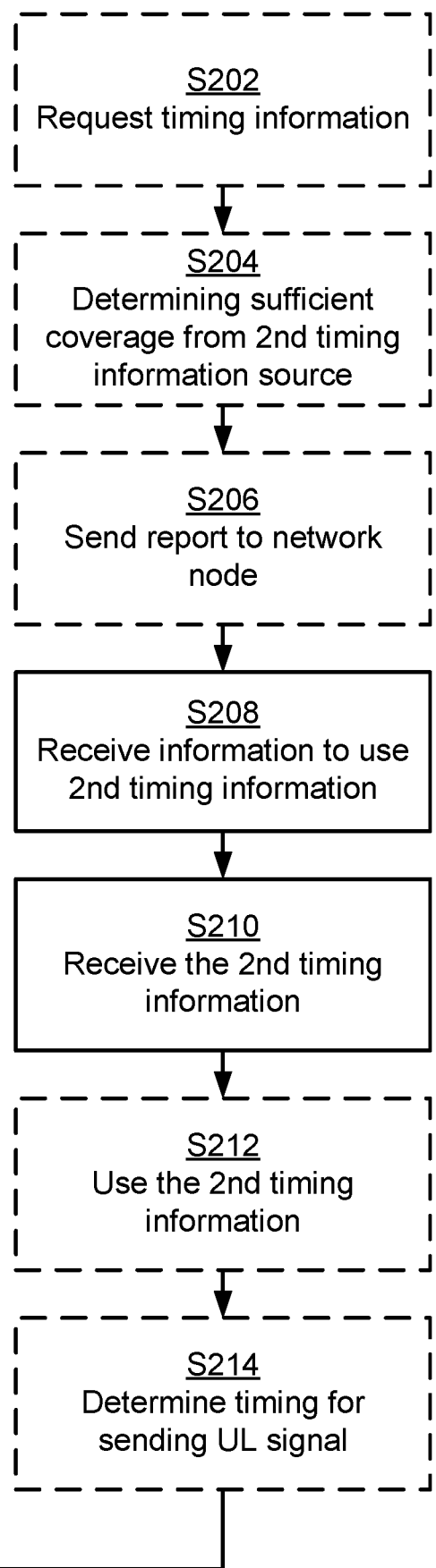

PROVISION OF TIME INFORMATION TO A WIRELESS DEVICE

RELATED APPLICATIONS

This application is a continuation of U.S. application Ser. No. 16/441,273 filed 14 Jun. 2019, which is a continuation of U.S. application Ser. No. 16/202,736 filed 28 Nov. 2018 and now issued as U.S. Pat. No. 10,362,537, which is a continuation of U.S. application Ser. No. 15/320,826 filed 21 Dec. 2016 and now issued as U.S. Pat. No. 10,172,084, which is a U.S. National Phase Application of PCT/EP2014/063871 filed 30 Jun. 2014. The entire contents of each aforementioned application is incorporated herein by reference.

TECHNICAL FIELD

Embodiments presented herein relate to provision of time information to a wireless device, and particularly to a method, a network node, a computer program, and a computer program product for providing timing information to a wireless device, and a method, a wireless device, a computer program, and a computer program product for acquiring timing information.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the availability of accurate system time information.

For example, accurate system time information may be required in radio-based communications networks in order to facilitate good sleep opportunities for both wireless devices and network nodes, saving significant power on both sides, without introducing any ambiguities in the communication links between the wireless devices and the network nodes. In general terms, time information is to the wireless device provided by the network node in the serving cell of the wireless device. By maintain per cell time information the need to synchronize cells is removed, simplifying deployment of radio-based communications networks.

Time information is provided in system broadcasts and the frequency and granularity of the information is a trade-off between sleep efficiency of the wireless devices, the maximum sleep time of the wireless devices, and system overhead. For example, in telecommunications networks based on the long term evolution (LTE) standards the system frame number is provided in the master information block (MIB) which is transmitted once every 10 ms. The time granularity is 10.24 seconds, or 1024 frames, limited by the number of bits used in the MIB to signal the frame number.

It has been considered to extend the time information in communications networks to enable longer sleep-times for the wireless device, for example by reserving additional bits for signaling or to introduce new messages for providing a secondary timing, differentiating between cycles of the existing timing.

However, in some communications networks, such as in some multi-layer multi technology environments, the ability of network energy saving by network node dormancy and overhead saving is reduced by the need to provide frequent time-information to enable efficient sleep of the wireless devices. The network node still frequently needs to provide time information in order for the wireless device to quickly (re-)acquire timing information.

Hence, there is still a need for an improved provision of time information to a wireless device.

SUMMARY

An object of embodiments herein is to provide improved provision of time information to a wireless device.

According to a first aspect there is presented a method for providing timing information of a first timing information source using timing information of a second timing information source to a wireless device. The method is performed by a network node. The method comprises determining that second timing information from the second timing information source is available and that timing information from the first timing information source is derivable from the second timing information. The method comprises instructing the wireless device to use the second timing information as a source for deriving first timing information of the first timing information source.

Advantageously this enables efficient provision of time information to the wireless device.

Advantageously this enables for long sleep-time in the wireless device and network nodes while reducing the overhead from providing timing information in the communications network.

According to a second aspect there is presented a network node for providing timing information of a first timing information source using timing information of a second timing information source to a wireless device. The network node comprises a processing unit. The processing unit is configured to determine that second timing information from the second timing information source is available and that timing information from the first timing information source is derivable from the second timing information. The processing unit is configured to instruct the wireless device to use the second timing information as a source for deriving first timing information of the first timing information source.

According to a third aspect there is presented a computer program for providing timing information of a first timing information source using timing information of a second timing information source to a wireless device, the computer program comprising computer program code which, when run on a processing unit, causes the processing unit to perform a method according to the first aspect.

According to a fourth aspect there is presented a method for acquiring timing information of a first timing information source using timing information of a second timing information source. The method is performed by a wireless device. The method comprises receiving instructions from a network node to use second timing information of the second timing information source as a source for deriving first timing information of the first timing information source. The method comprises receiving the second timing information from the second timing information source.

According to a fifth aspect there is presented a wireless device for acquiring timing information of a first timing information source using timing information of a second timing information source. The wireless device comprises a processing unit. The processing unit is configured to receive instructions from a network node to use second timing information of the second timing information source as a source for deriving first timing information of the first timing information source. The processing unit is configured to receive the second timing information from the second timing information source.

According to a sixth aspect there is presented a computer program for acquiring timing information of a first timing information source using timing information of a second timing information source, the computer program comprising computer program code which, when run on a processing unit, causes the processing unit to perform a method according to the fourth aspect.

According to a seventh aspect there is presented a computer program product comprising a computer program according to at least one of the third aspect ad the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 2a is a schematic diagram showing functional units of a network node according to an embodiment;

FIG. 2b is a schematic diagram showing functional modules of a network node according to an embodiment;

FIG. 3a is a schematic diagram showing functional units of a wireless device according to an embodiment;

FIG. 3b is a schematic diagram showing functional modules of a wireless device according to an embodiment;

FIG. 4 shows one example of a computer program product comprising computer readable means according to an embodiment;

FIGS. 5, 6, 7, and 8 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
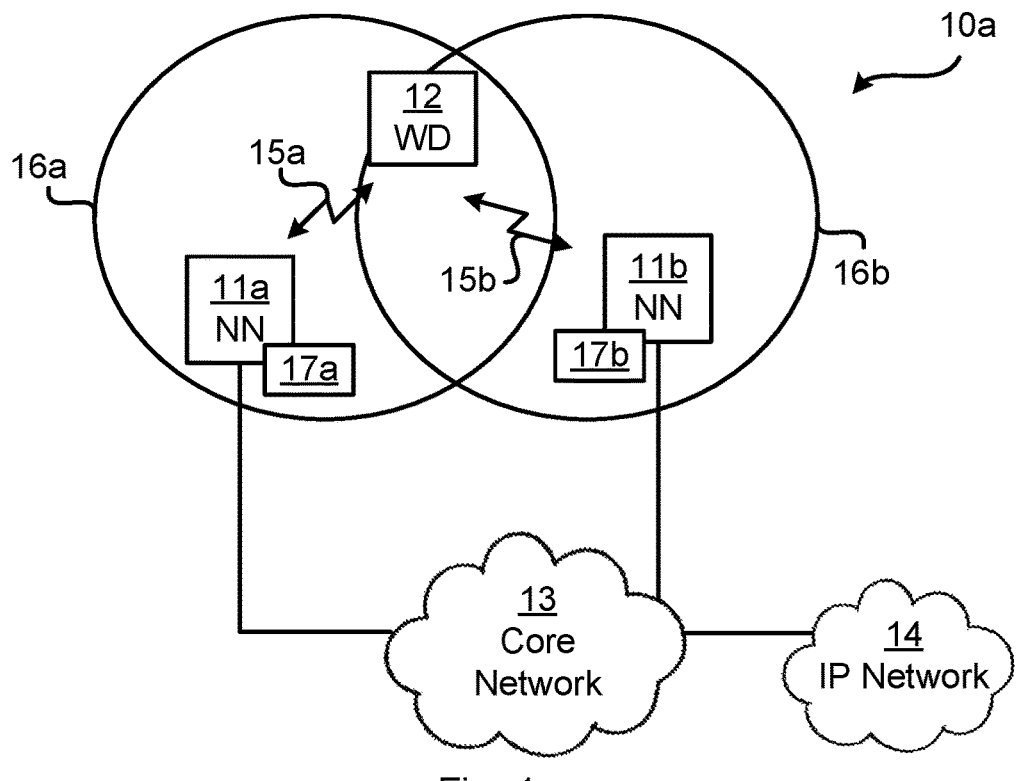
FIGS. 1a and 1b are schematic diagrams illustrating a communications network according to embodiments.

FIG. 1a is a schematic diagram illustrating a communications network 10a where embodiments presented herein can be applied. The communications network 10a comprises radio transceiver devices 11a, 11b in the form of network nodes (NNs). The network nodes may be provided as any combination of radio access network nodes such as base transceiver stations (BTSs), Node Bs, Evolved Node Bs, or access points, such as access points for Wi-Fi. The radio transceiver devices 11a, 11b in FIG. 1a are configured to provide network coverage in cells 16a, 16b to a radio transceiver device 12 in the form of a wireless device (WD). The wireless device may be a portable wireless transceiver device, such as a mobile phone, a smartphone, a tablet computer, a laptop computer or the like, or other type of user equipment (UE) or Wi-Fi device. Within the cells 16a, 16b the radio transceiver devices 11a, 11b thus act as radio base stations for the radio transceiver device 12. The radio transceiver devices 11a, 11b and the radio transceiver device 12 are configured to be operatively connected via wireless links 15a, 15b. The communications network 10a further comprises a core network 13. The radio transceiver devices 11a, 11b are operatively connected to the core network 13. The core network 13 is in turn operatively connected to an Internet Protocol (IP) based service network 14. The radio transceiver device 12 is thereby enabled to access content and services as provided by the IP based service network 14 via the wireless links 15a, 15b.

Figure 1B:
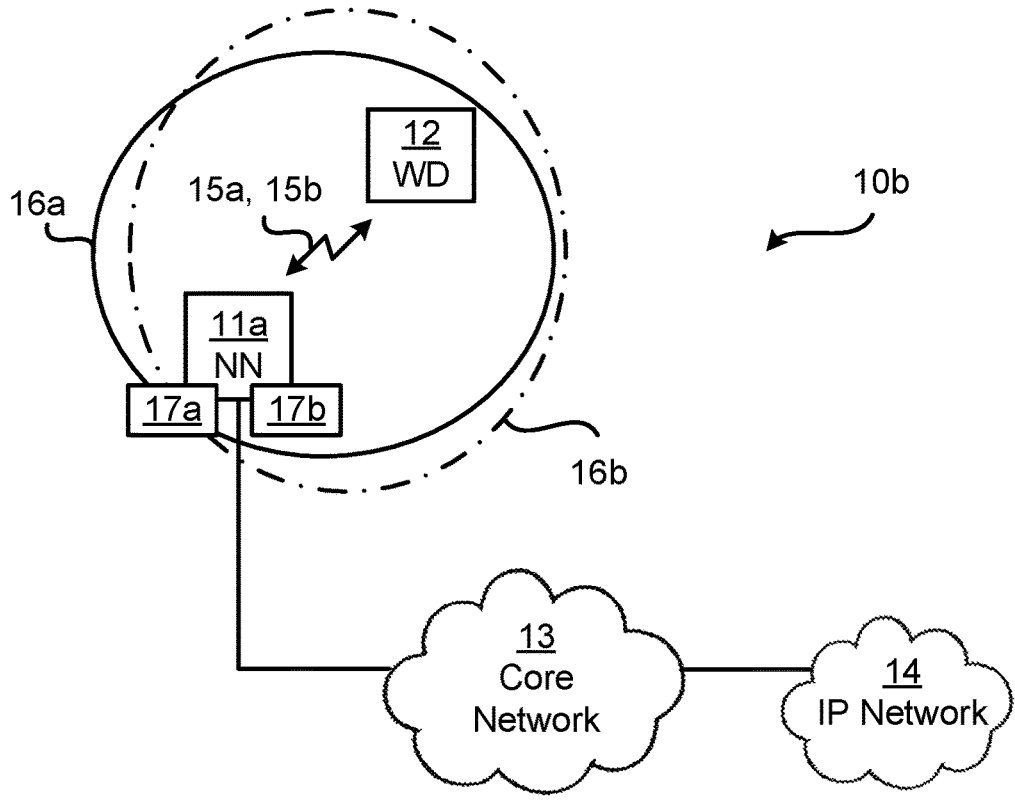

FIG. 1b is a schematic diagram illustrating a communications network 10b where embodiments presented herein can be applied. The communications network 10b is similar to the communications network 10a of FIG. 1a and comprises a radio transceiver device 11 in the form of a network node 11a configured to provide network coverage to a radio transceiver device 12 in the form of a wireless device. The radio transceiver device 11a is configured to provide network coverage in cells 16a, 16b, for example using different radio access technologies. Hence, the radio transceiver device 11a may alternatingly in time or frequency or at the same time and/or frequency act as a base transceiver station (BTS), a Node B, an Evolved Node B, and an access point. The communications network 10b further comprises a core network 13 as disclosed with reference to FIG. 1a and a service network 14 as disclosed with reference to FIG. 1a.

Each network node 11a, 11b comprises a timing information source 17a, 17b and is configured to provide timing information to the wireless device 12. In the example of FIG. 1a the network node 11a comprises a first timing information source 17a and the network node 11b comprises a second timing information source 17b. In the example of FIG. 1b the network node 11a comprises a first timing information source 17a and a second timing information source 17b. The timing information may represent system time information in the communications network 10a, 10b. At least some of the herein disclosed embodiments enable a network node 11a (or timing information source) of a first cell 16a to inform a wireless device 12 about timing information of a second cell 16b and/or a network node 11a (or timing information source) of a first cell 16a to provide the wireless device 12 with information about a second cell 16b that can provide timing information to the wireless device 12 of the first cell 16a. At least some of the herein disclosed embodiments enable a wireless device 12 to utilize this information to derive timing for monitoring a downlink channel and to improve its sleep time.

The embodiments disclosed herein particularly relate to timing information related to a wireless device. In order to provide timing information of a first timing information source using timing information of a second timing information source to a wireless device there is provided a network node, a method performed by the network node, a computer program comprising code, for example in the form of a computer program product, that when run on a processing unit of the network node, causes the network node to perform the method. In order to acquire timing information of a first timing information source using timing information of a second timing information source there is further provided a wireless device, a method performed by the wireless device, a computer program comprising code, for example in the form of a computer program product, that when run on a processing unit of the wireless device, causes the wireless device to perform the method.

FIG. 2a schematically illustrates, in terms of a number of functional units, the components of a network node 11a according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus, the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The network node 11a may further comprise a communications interface 22 for communications with another network node 11b, the core network 13, and at least one wireless device 12. As such the communications interface 22 may comprise one or more transmitters and receivers, comprising analogue and digital components and a suitable number of antennas for radio communications and a suitable number of ports for wired communications. The processing unit 21 controls the general operation of the network node 11a e.g. by sending data and control signals to the communications interface 22 and the storage medium 23, by receiving data and reports from the communications interface 22, and by retrieving data and instructions from the storage medium 23. Other components, as well as the related functionality, of the network node 11a are omitted in order not to obscure the concepts presented herein.

FIG. 2b schematically illustrates, in terms of a number of functional modules, the components of a network node 11a according to an embodiment. The network node 11a of FIG. 2b comprises a number of functional modules; a determine module 21a, and an instruct module 21b. The network node 11a of FIG. 2b may further comprises a number of optional functional modules, such as any of a provide module 21c, a notify module 21d, a send and/or receive module 21e, and a check module 21f. The functionality of each functional module 21a-f will be further disclosed below in the context of which the functional modules 21a-f may be used. In general terms, each functional module 21a-f may be implemented in hardware or in software. Preferably, one or more or all functional modules 21a-f may be implemented by the processing unit 21, possibly in cooperation with functional units 22 and/or 23. The processing unit 21 may thus be arranged to from the storage medium 23 fetch instructions as provided by a functional module 21a-f and to execute these instructions, thereby performing any steps as will be disclosed hereinafter.

FIG. 3a schematically illustrates, in terms of a number of functional units, the components of a wireless device 12 according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a storage medium 43. Thus, the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The wireless device 12 may further comprise a communications interface 32 for communications with at least one network node 11a, 11b. As such the communications interface 32 may comprise one or more transmitters and receivers, comprising analogue and digital components and a suitable number of antennas for radio communications. The processing unit 31 controls the general operation of the wireless device 12 e.g. by sending data and control signals to the communications interface 32 and the storage medium 33, by receiving data and reports from the communications interface 32, and by retrieving data and instructions from the storage medium 33. Other components, as well as the related functionality, of the wireless device 12 are omitted in order not to obscure the concepts presented herein.

FIG. 3b schematically illustrates, in terms of a number of functional modules, the components of a wireless device 12 according to an embodiment. The wireless device 12 of FIG. 3b comprises a send and/or receive module 31a. The wireless device 12 of FIG. 3b may further comprises a number of optional functional modules, such as any of a use module 31b, a determine module 31c, and a request module 31d. The functionality of each functional module 31a-d will be further disclosed below in the context of which the functional modules 31a-d may be used. In general terms, each functional module 31a-d may be implemented in hardware or in software. Preferably, one or more or all functional modules 31a-d may be implemented by the processing unit 31, possibly in cooperation with functional units 32 and/or 33. The processing unit 31 may thus be arranged to from the storage medium 33 fetch instructions as provided by a functional module 31a-d and to execute these instructions, thereby performing any steps as will be disclosed hereinafter.

FIG. 4 shows one example of a computer program product 41a, 41b comprising computer readable means 43. On this computer readable means 43, a computer program 42a can be stored, which computer program 42a can cause the processing unit 21 and thereto operatively coupled entities and devices, such as the communications interface 22 and the storage medium 23, to execute methods according to embodiments described herein. The computer program 42a and/or computer program product 41a may thus provide means for performing any steps as herein disclosed. On this computer readable means 43, a computer program 42b can be stored, which computer program 42b can cause the processing unit 31 and thereto operatively coupled entities and devices, such as the communications interface 32 and the storage medium 33, to execute methods according to embodiments described herein. The computer program 42b and/or computer program product 41b may thus provide means for performing any steps as herein disclosed.

In the example of FIG. 4, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while each computer program 42a, 42b is here schematically shown as a track on the depicted optical disk, the computer program 42a, 42b can be stored in any way which is suitable for the computer program product 41a, 41b.

FIGS. 5 and 6 are flow chart illustrating embodiments of methods for providing timing information of a first timing information source using timing information of a second timing information source to a wireless device as performed by the network node 11a. FIGS. 7 and 8 are flow chart illustrating embodiments of methods for acquiring timing information of a first timing information source using timing information of a second timing information source as performed by the wireless device 12. The methods are advantageously provided as computer programs 42a, 42b.

Network Node

Reference is now made to FIG. 6 illustrating a method for providing timing information of a first timing information source 17a using timing information of a second timing information source 17b to a wireless device 12 as performed by a network node 11a according to an embodiment. Parallel references are made to the signalling diagrams of FIGS. 9 and 10.

The network node 11a in a step S104 determines that second timing information from the second timing information source 17b is available. The network node 11a in step S104 further determines that timing information from the first timing information source 17a is derivable from the second timing information. The network node 11a may be configured to perform step S104 by the processing unit 21 executing functionality of the determine module 21a. The computer program 42a and/or computer program product 41a may thus provide means for this step.

The network node 11a in a step S106 instructs the wireless device 12 to use the second timing information as a source for deriving the timing information of the first timing information source 17a. The network node 11a may be configured to perform step S106 by the processing unit 21 executing functionality of the instruct module 21b. The computer program 42a and/or computer program product 41a may thus provide means for this step.

This enables a timing information source of one cell 16a to provide time information to a wireless device 12 in a second cell 16b, and by doing so enable the wireless device 12 to save power. This also enables overhead in the communications network 10a, 10b in an area where coverage already exist from a second timing information source to be reduced.

Reference is now made to FIG. 7 illustrating methods for providing timing information of a first timing information source 17a using timing information of a second timing information source 17b to a wireless device 12 as performed by a network node 11a according to further embodiments. Parallel references are continued to the signalling diagrams of FIGS. 9 and 10.

The timing information provided by the first timing information source 17a and the second timing information source 17b may represent system time information in the communications network 10a, 10b. The second timing information may be provided on a separate (dedicated) carrier frequency. Further details of the timing information will be provided below.

There may be different ways for the network node 11a to acquire the information that the second timing information is available. According to one general embodiment the information that the second timing information is available is acquired from the wireless device. According to one general embodiment the information that the second timing information is available is acquired from the second timing information source 17b. According to one general embodiment the information that the second timing information is available is acquired from a network node 11b of the second timing information source 17b.

There may be different types of timing information sources 17a, 17b. According to one general embodiment the first timing information source 17a is a timing information source of a first cell 16a. According to one general embodiment the second timing information source 17b is a timing information source of a second cell 16b. The first cell 16a and the second cell 16b may be served by the same network node 11a. Hence the first timing information source 17a and the second timing information source 17b may be provided in the same network node 11a.

The first cell 16a may be a serving cell of the wireless device 12 when the network node 11a instructs the wireless device 12 to use the second timing information as its source for timing information in step S106.

In some embodiments the first timing information source 17a and the second timing information source 17b are separable by having different geographical coverage area, be transmitted from separate points, such as from different network nodes 11a, 11b, be transmitted on different carrier frequencies and/or constitute different radio access technologies. The first timing information source 17a and the second timing information source 17b may thus use the same or different radio access technologies (RATs) for transmitting timing information. The first timing information source 17a and the second timing information source 17b may thus transmit in the same or different area. Hence the first timing information source 17a and the second timing information source 17b may have the same or different network coverage. The first timing information source 17a and the second timing information source 17b may thus use the same or different carrier frequency for transmitting timing information. Hence, according to one general embodiment at least one of RAT, network coverage, and carrier frequency of the first timing information source 17a and the second timing information source 17b is different. Hence, according to one general embodiment the first timing information source 16a share at least one of RAT, network coverage, and carrier frequency with the second timing information source 17b.

Figure 11:
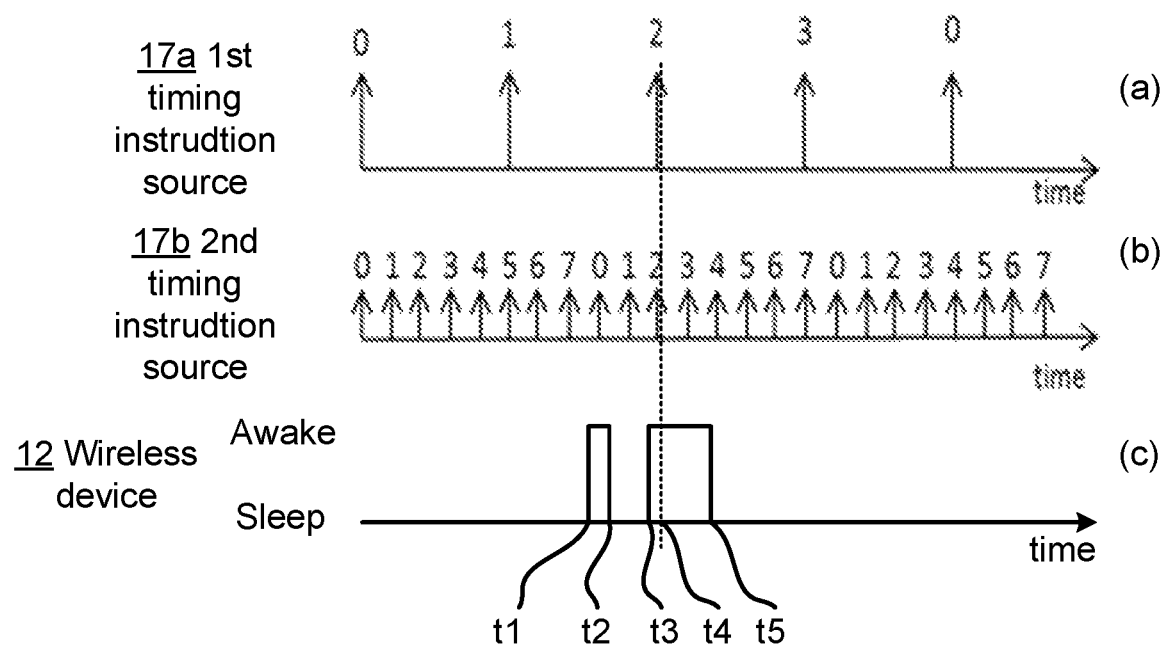
FIG. 11 schematically illustrates timing information according to an embodiment.

The network node 11a may also provide timing information to the wireless device 12. Particularly, the network node 11a may, in an optional step S108, provide timing information of the first timing information source 17a to the wireless device 12. The network node 11a may be configured to perform step S108 by the processing unit 21 executing functionality of the provide module 21c. The computer program 42a and/or computer program product 41a may thus provide means for this step. The timing information of the first timing information source 17a and the timing information of the second timing information source 17b may by the wireless device 12 be used separately, complementary, or joint. In some embodiments the network node 11a notifies the wireless device 12 served by the network node 11a of the first timing information source 17a to acquire a better time resolution by combining timing information from first timing information source 17a and the second timing information source 17b. Thus, the network node 11a may, in an optional step S110, instruct the wireless device 12 to combine the timing information of the second timing information source 17b and the timing information of the first timing information source 17a. The network node 11a may be configured to perform step S110 by the processing unit 21 executing functionality of the instruct module 21b. The computer program 42a and/or computer program product 41a may thus provide means for this step In some embodiments a first timing information source 17a provides timing information with a first resolution and a second cell timing information source 17b provides timing information of a second resolution, where resolution here refers to the time duration of a time-cycle in a first cell 16a and a second cell 16b, or the time between messages as issued by the first timing information source 17a and the second timing information source 17b indicating current system time. The timing information of the second timing information source 17b and the timing information of the first timing information source 17a may thus have different resolution. This is illustrated in FIG. 11 (see below). For example, the timing information of the second timing information source 17b may have higher resolution than the timing information of the first timing information source 17a. This is illustrated in FIG. 11 (see below). The resolution may thus be defined by a time duration of a time-cycle or a time duration between two messages indicating current system time.

In some embodiments the time granularity of the first timing information source 17a and the second timing information source 17b is the same, but the frequency of providing time information is different. In this case it may be sufficient to inform the wireless device 12 about a relation in time between the first timing information source 17a and the second timing information source 17b. Further, the timing information of the second timing information source 17b and the timing information of the first timing information source 17a may thus have same time granularity. A frequency of providing the timing information of the second timing information source 17b and the timing information of the first timing information source 17b may thus be different.

The total time cycle length of the timing information of the first timing information source 17a may be different from the total cycle length of the timing information of the second timing information source 17b. This is illustrated in FIG. 11 (see below). Thus, in some embodiments the total time cycle length of the first timing information source 17a is different from the total cycle length of the second timing information source 17b. If the difference in cycle length is kept a non-multiple of each other, the two timing information sources 17a, 17b will drift in relation to each other in frame number in a predictable way, thereby enabling the timing information from the two timing information sources 17a, 17b to be combined, thus enabling an extended time granularity to be determined. As an example, consider timing information sources 17a, 17b of two long term evolution (LTE) cells where the timing information source 17b of one cell makes a slight intentional time-error such that the time-cycle of one cell is 10.23 s while the other cell has a time-cycle of 10.24 s. This would effectively scale up the granularity of the timing information up to more than 100 s. A wireless device 12 may then be configured to monitor paging in any radio-frame fulfilling its paging occasion in both cells simultaneously, giving a significantly longer, but still deterministic paging cycle.

Properties of the first timing information source 17a and the second timing information source 17b may be reported to the wireless device 12. For example, the network node 11a may, in an optional step S112, notify the wireless device 12 about a relation in time between the timing information of the second timing information source 17b and the timing information of the first timing information source 17a. The network node 11a may be configured to perform step S112 by the processing unit 21 executing functionality of the notify module 21d. The computer program 42a and/or computer program product 41a may thus provide means for this step. In some embodiments the network node 11a notifies the wireless device 12 about a maximum drift in time between the first timing information source 17a and the second timing information source 17b. Thus, the network node 11a may, in an optional step S114, notify the wireless device 12 about a drift in time between the timing information of the first timing information source 17a and the timing information of the second timing information source 17b. The network node 11a may be configured to perform step S114 by the processing unit 21 executing functionality of the notify module 21d. The computer program 42a and/or computer program product 41a may thus provide means for this step.

There may be different reasons for the network node 11a to determine that second timing information from the second timing information source 17b is available, as in step S104. In some embodiments the wireless device 12 reports to the network node 11a in its serving cell if it has sufficient coverage from a second timing information source 17b to use it for time reference. Thus, the determining in step S104 may be triggered by a request from the wireless device 12. Hence, the network node 11a may, in an optional step S102, receive a request from the wireless device 12 to provide timing information. The network node 11a may be configured to perform step S102 by the processing unit 21 executing functionality of the send and/or receive module 21e. The computer program 42a and/or computer program product 41a may thus provide means for this step The determining in step S104 and the instructing in step S106 may then be performed in response to the request being received by the network node 11a as in step S102. The network node 11a may be configured to handle the request received in step S102 based on at least one property of the wireless device 12 sending the request. One such property is a subscription. Particularly, the network node 11a may, in an optional step S118, check a subscription criterion of the wireless device 12. The network node 11a may be configured to perform step S118 by the processing unit 21 executing functionality of the check module 21f. The computer program 42a and/or computer program product 41a may thus provide means for this step. The instructing in step S102 may then be performed only if the subscription criterion is fulfilled. The subscription criterion may relate to a subscription to additional timing information (in addition to timing information as provided by the timing information source 17a of the serving network node 11a of the wireless device 12). Hence the instructing in step S102 may be performed only if the wireless device 12 has a subscription to such additional timing information.

In some embodiments additional information is provided at the time-occasions when timing information is provided, where this additional information provides information about the need for the wireless device 12 to in the following time period wake up and monitor for scheduling. As an example, a signal which provides timing information of a specific granularity may be accompanied by a signal indication if the network node 11a has any pending paging messages to be delivered, to all or a subset of served wireless devices 12 until the next occasion of a signal providing timing information of the same granularity. This can be provided in a multi-step signaling approach, where timing information is provided on multiple levels of granularity.

In some embodiments additional resources may be configured by a network node 11a to provide timing information, for example in the case that the network node 11a serves a wireless device 12 without coverage from any second timing information source 17b. The network node 11a may thus, in an optional step S120, provide further timing information to the wireless device 12. The network node 11a may be configured to perform step S120 by the processing unit 21 executing functionality of the provide module 21c. The computer program 42a and/or computer program product 41a may thus provide means for this step. This further timing information may be different from or identical to the timing information of the second timing information source 17b. For example, the network node 11a may, in an optional step S116, receive an indication from the wireless device 12 that the timing information of the second timing information source 17b is not available. The network node 11a may be configured to perform step S116 by the processing unit 21 executing functionality of the send and/or receive module 21e. The computer program 42a and/or computer program product 41a may thus provide means for this step. The further timing information may then be provided to the wireless device 12 in response thereto. For example, the wireless device 12 may be outside coverage 16b of the second timing information source 17b and hence not be able to directly receive any timing information from the second timing information source 17b. The wireless device 12 may then request further timing information from the network node 11a. The further timing information may by the network node 11a be provided to the wireless device 12 during a time interval in which the wireless device 12 is configured to wake up and monitor for scheduling.

In some embodiments it is the second timing information source 17b that provides the wireless device 12 with information about time information for the first timing information source 17a. This information may for example be provided in system broadcast where the second timing information source 17b may point out one or multiple other cells, for which it can provide a time reference.

In some embodiments it is not a specific cell that is indicated but a carrier frequency, where any cell on the indicated carrier frequency can be used for time reference or use this cell as time reference. An example of such a communications network is where a new radio access technology that provides system information, and related timing information on a slow time-scale, e.g. by a broadcast message sent ones every 10.24 second is added to an existing communications network. If this new radio access technology is deployed in an area with at least partial existing network coverage, such as long term evolution (LTE) coverage, the wireless device 12 may be informed, from the network node 11a of the serving cell 16a or from the LTE cell (as exemplified by cell 16b), that these two cells share a timing relation, or a maximal time drift. The wireless device 12 may then utilize this information to wake up and monitor the time-information on the LTE cell, provided every 10 ms, to correct its current clock-timing towards the serving cell 16a. This enables the wireless device 12 longer sleep-time and more accurate wake-up, thus saving power in the wireless device 12.

Wireless Device

Reference is now made to FIG. 8 illustrating a method for acquiring timing information of a first timing information source 17a using timing information of a second timing information source 17b as performed by a wireless device 12 according to an embodiment. Parallel references are continued to the signalling diagrams of FIGS. 9 and 10.

The wireless device 12 in a step S208 receives instructions from a network node 11a to use second timing information of a second timing information source 17b as a source for deriving first timing information of the first timing information source 17b. The wireless device 12 may be configured to perform step S208 by the processing unit 31 executing functionality of the send and/or receive module 31a. The computer program 42b and/or computer program product 41a may thus provide means for this step.

The wireless device 12 in a step S210 receives the second timing information from the second timing information source 17b. The wireless device 12 may be configured to perform step S210 by the processing unit 31 executing functionality of the send and/or receive module 31a. The computer program 42b and/or computer program product 41a may thus provide means for this step.

Figure 9:
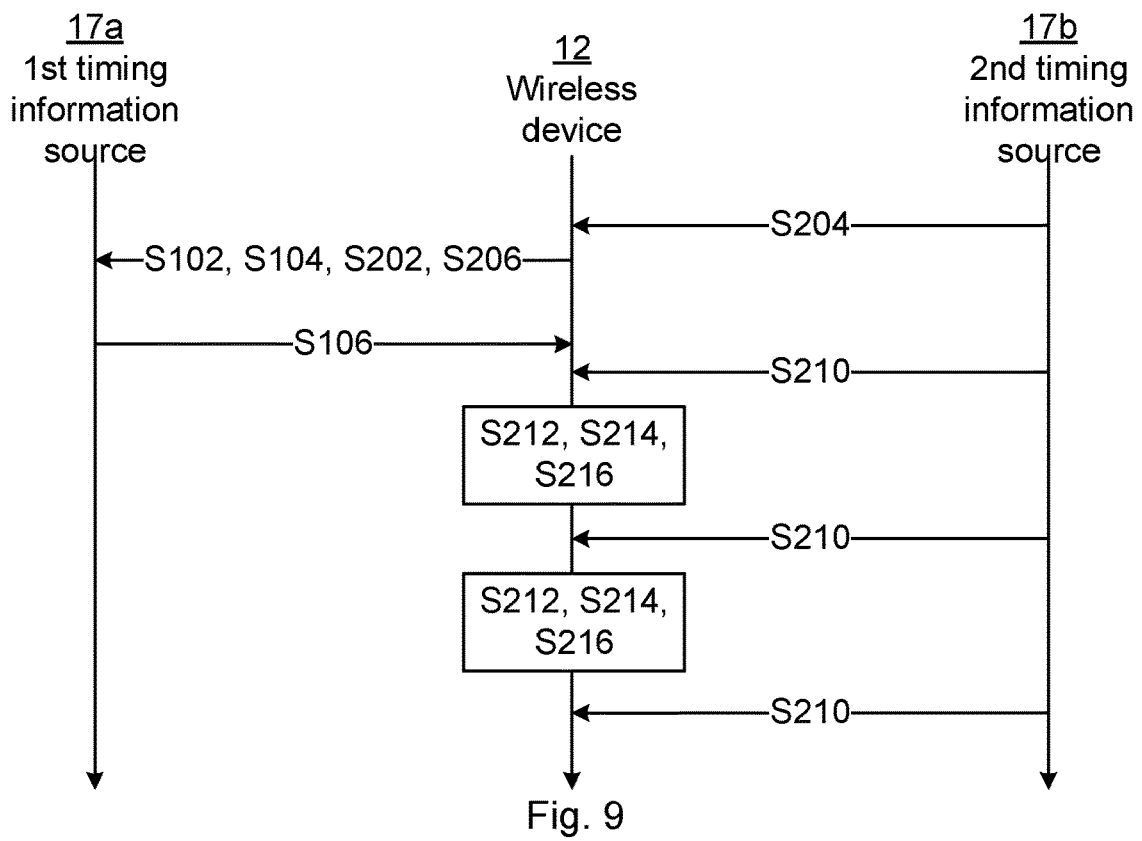
FIGS. 9 and 10 are signalling diagrams according to embodiments.
Figure 10:
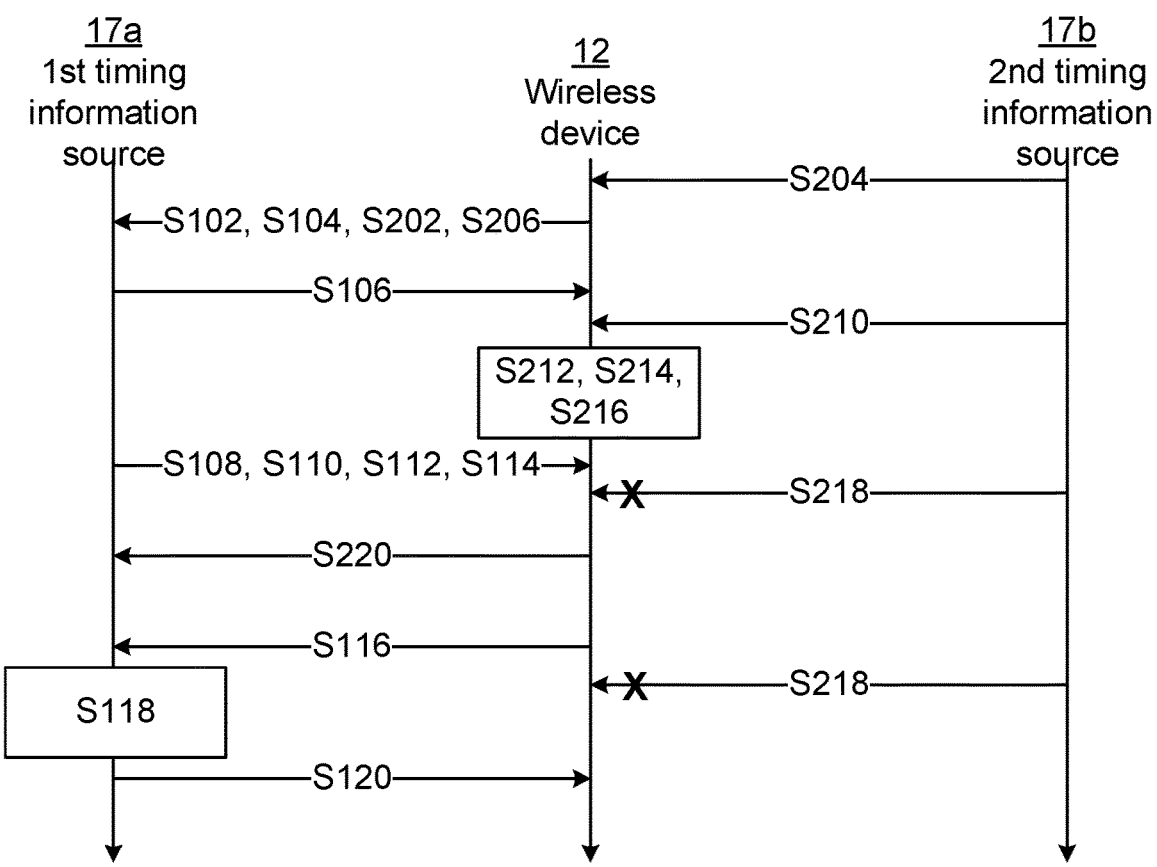

Reference is now made to FIG. 9 illustrating methods for acquiring timing information of a first timing information source 17a using timing information of a second timing information source 17b as performed by a wireless device 12 according to further embodiments. Parallel references are continued to the signalling diagrams of FIGS. 9 and 10.

The wireless device 12 may, in an optional step S212, use the second timing information as its source for timing information. The wireless device 12 may be configured to perform step S212 by the processing unit 31 executing functionality of the use module 31b. The computer program 42b and/or computer program product 41a may thus provide means for this step. There are different ways for the wireless device 12 to use the second timing information as its source for timing information. For example, the wireless device may, in an optional step S214, determine, based on the second timing information, timing for when to transmit an uplink signal to the network node 11a of the first timing information source 17a. The wireless device 12 may be configured to perform step S214 by the processing unit 31 executing functionality of the determine module 31c. The computer program 42b and/or computer program product 41a may thus provide means for this step. In some embodiments the wireless device 12 uses the provided timing information to e.g. calculate time occasions to monitor a downlink channel. Thus, the wireless device may, in an optional step S216, determine, based on the second timing information, timing for when to monitor a downlink channel. The wireless device 12 may be configured to perform step S216 by the processing unit 31 executing functionality of the determine module 31c. The computer program 42b and/or computer program product 41a may thus provide means for this step.

As disclosed above, one reason for the network node 11a to determine that second timing information from the second timing information source 17b is available, as in step S104, is a request as received by the network node 11a, as in step S102, from the wireless device 12. Hence, the wireless device 12 may, in an optional step S202, request timing information from the network node 11a of the first timing information source 17a. The wireless device 12 may be configured to perform step S202 by the processing unit 31 executing functionality of the request module 31d. The computer program 42b and/or computer program product 41a may thus provide means for this step.

Further, the wireless device 12 may, in an optional step S204, determine that the wireless device 12 has sufficient coverage 16b from the second timing information source 16b. The wireless device 12 may be configured to perform step S204 by the processing unit 31 executing functionality of the determine module 31c. The computer program 42b and/or computer program product 41a may thus provide means for this step. The wireless device 12 may then, in an optional step S206, send a report thereof to the network node 11a of the first timing information source 17a. The wireless device 12 may be configured to perform step S206 by the processing unit 31 executing functionality of the send and/or receive module 31a. The computer program 42b and/or computer program product 41a may thus provide means for this step. The network node 11a may then determine whether or not to instruct the wireless device 12 to use the use the second timing information as its source for timing information.

As disclosed above, the network node 11a may, in an optional step S116, receive an indication from the wireless device 12 that the timing information of the second timing information source 17b is not available. In some embodiments there may thus be occasions where the wireless device 12 does not have sufficient coverage from the second timing information source 17b. This can however be detected by the wireless device 12 and may result in the wireless device 12 having to keep track of the timing information provided by the network node 11 of its serving cell. This would remove the power saving opportunity for this specific wireless device 12 but not break the system operation. Therefore, the wireless device 12 may, in an optional step S218, determine that the wireless device 12 does not have sufficient coverage 16b from the second timing information source 17b. The wireless device 12 may be configured to perform step S218 by the processing unit 31 executing functionality of the determine module 31c. The computer program 42b and/or computer program product 41a may thus provide means for this step. The wireless device 12 may then, in an optional step S220, send a report thereof to the network node 11a of the first timing information source 17a. The wireless device 12 may be configured to perform step S220 by the processing unit 31 executing functionality of the send and/or receive module 31a. The computer program 42b and/or computer program product 41a may thus provide means for this step. The network node 11a may then determine whether or not to provide further timing information to the wireless device 12, as in step S120.

EXAMPLES

As an example, consider a wireless device 12 camping on a carrier frequency in a serving cell 16a that does not provide any timing information except for a periodic sync signal sent out with a periodicity Psync of subframes. The timing information of the first timing information source 17a may thus represent such as periodic sync signal. On a separate carrier frequency, another cell 16b covers the same area providing time resolution of up to 10.24 s in CellBSFN, where SFN is short for system frame number, and where CellB is the cell of the second timing information source 17b. A wireless device 12 could then derive a set of subframes (SF) to monitor a control channel as all subframes fulfilling:

$$SF \bmod Psync=n; \text{ and}$$

$$floor(CellBSFN/k)*q \bmod 1024=m,$$

where n, k, q and m are parameters (derived or configured) for the wireless device 12. Hence the set of subframes SF may be written as SF={all x; x mod Psync=n} and the set of possible SFN may be written as SFN={all y; floor(CellBy/k)*q mod 1024=m}, where CellBy is system frame number y. Hence, SF is a subframe number in cell 16a (using the first timing information source 17a), and SFN is a subframe number in cell 16b (using the second timing information source 17b). The subframe monitoring would hence be done in SF number n of the serving cell 16a of the wireless device 12, but only during time durations where the timing information of the second timing information source 17b fulfills some condition.

FIG. 11 schematically illustrates an example of two timing information sources 17a, 17b operating with different time information, where the first timing information source 17 has a larger maximum time and where the second timing information source 17b provides more frequent time information. As an example, a timing information system for providing system time to a wireless device 12 may be formed by multiple signals, e.g. one timing signal T1 sent every N subframes (as represented by the first timing information source 17a in part (a) of FIG. 11) and a second timing signal T2 sent every m*N subframes (as represented by the second timing information source 17b in part (b) of FIG. 11), and so on. A wireless device 12 (as represented by the wireless device in part (c) of FIG. 11) waking up from a very long sleep time would first have to locate the second timing signal T2 (at time t1 in FIG. 11) to find timing information of needed granularity. After finding the T2 timing information the wireless device 12 may go back to sleep (at time t2 in FIG. 11) to wake up (at time t3 in FIG. 11) and find T1 to finally wake up at the paging occasion (at time t4 in FIG. 11) relative T2 and T1 and then go to sleep again (at time t5 in FIG. 11). The wireless device 12 may also back to sleep again (at time t5 in FIG. 11) and skip the paging occasion if information that no paging is sending is received at the occasion of T2 or T1 (e.g., at time t4 in FIG. 11).

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A method performed by a network node, the method comprising:
   determining that second timing information is available at a wireless device and that timing of a first cell is derivable from the second timing information, wherein the second timing information is periodically transmitted via a second cell, to indicate timing of the second cell; and
   instructing, via the second cell, the wireless device to derive the timing of the first cell using the second timing information, wherein System Frame Numbers (SFNs) indicated in the second timing information are usable by the wireless device to identify subframes of the first cell to monitor for control-channel signaling;

wherein the first and second cells are cells of one or more radio access networks, and wherein the network node operates in at least one of the one or more radio access networks.

2. The method according to claim 1, further comprising determining that the second timing information is available at the wireless device, based on information acquired from the wireless device.

3. The method according to claim 1, further comprising determining that the second timing information is available at the wireless device, based on information acquired from the second cell.

4. The method according to claim 1, wherein the instructing includes providing instructions for the wireless device to derive the timing of the first cell using the second timing information at least during intervals between the first cell periodically transmitting first timing information that indicates the timing of the first cell.

5. The method according to claim 1, wherein the first cell is a serving cell of the wireless device.

6. The method according to claim 1, wherein at least one of radio access technology, network coverage, and carrier frequency of the first cell and the second cell is different.

7. The method according to claim 1, wherein the first cell shares at least one of radio access technology, network coverage, and carrier frequency with the second cell.

8. A method performed by a wireless device, the method comprising:
receiving instructions, via a second cell, to use second timing information to derive timing of a first cell, wherein the first and second cells are cells of one or more radio access networks and the second timing information is periodically transmitted via the second cell and indicates timing of the second cell;
receiving the second timing information from the second cell;
deriving the timing of the first cell using the second timing information;
determining a set of subframes to monitor for control channel transmissions in the first cell, based on the timing of the first cell, as derived from the second timing information; and
determining System Frame Numbers (SFNs) for the first cell based on SFN indications received in the second timing information from the second cell.

9. The method according to claim 8, wherein the instructions instruct the wireless device to derive the timing of the first cell using the second timing information at least during intervals between periodic transmissions, by the first cell, of first timing information that indicates the timing of the first cell.

10. The method according to claim 8, wherein a carrier frequency of the first cell is different from a carrier frequency of the second cell.

11. A network node that comprises:
communication circuitry configured for communication with a wireless device or with another node that is configured for communication with the wireless device; and
processing circuitry operatively associated with the communication circuitry and configured to:
determine that second timing information is available at the wireless device and that timing of a first cell is derivable from the second timing information, wherein the second timing information is periodically transmitted via a second cell, to indicate timing of the second cell; and
instruct, via the second cell, the wireless device to derive the timing of the first cell using the second timing information, wherein System Frame Numbers (SFNs) indicated in the second timing information are usable by the wireless device to identify subframes of the first cell to monitor for control-channel signaling; and
wherein the first and second cells are cells of one or more radio access networks, and wherein the network node is configured for operation in association with at least one of the one or more radio access networks.

12. A wireless device comprising:
communication circuitry configured for communication with one or more radio access networks; and
processing circuitry operatively associated with the communication circuitry and configured to:
receive instructions, via a second cell, to use second timing information to derive timing of a first cell, wherein the first and second cells are cells of the one or more radio access networks, and wherein the second timing information is periodically transmitted via the second cell and indicates timing of the second cell;
receive the second timing information from the second cell;
derive the timing of the first cell using the second timing information;
determine a set of subframes to monitor for control channel transmissions in the first cell, wherein the determining the set of subframes to monitor is based on the timing of the first cell, as derived from the second timing information; and
determine System Frame Numbers (SFN) for the first cell based on SFN indications received in the second timing information from the second cell.

13. The wireless device according to claim 12, wherein the processing circuitry is configured to control the wireless device to:
camp on a downlink carrier of the first cell that provides a periodic synchronization signal with a first periodicity; and
maintain synchronization with the downlink carrier during intervals between transmission of the periodic synchronization signal using the second timing information, which is transmitted with a shorter periodicity than the periodic synchronization signal.

* * * * *